March 29, 1960  W. E. MURRAY  2,930,656
TRACTION ATTACHMENTS FOR AUTOMOBILE WHEELS
Filed Nov. 10, 1958  2 Sheets-Sheet 1

INVENTOR
WILBUR E. MURRAY
BY J. Hanson Boyden,
ATTORNEY.

March 29, 1960 — W. E. MURRAY — 2,930,656
TRACTION ATTACHMENTS FOR AUTOMOBILE WHEELS
Filed Nov. 10, 1958 — 2 Sheets-Sheet 2
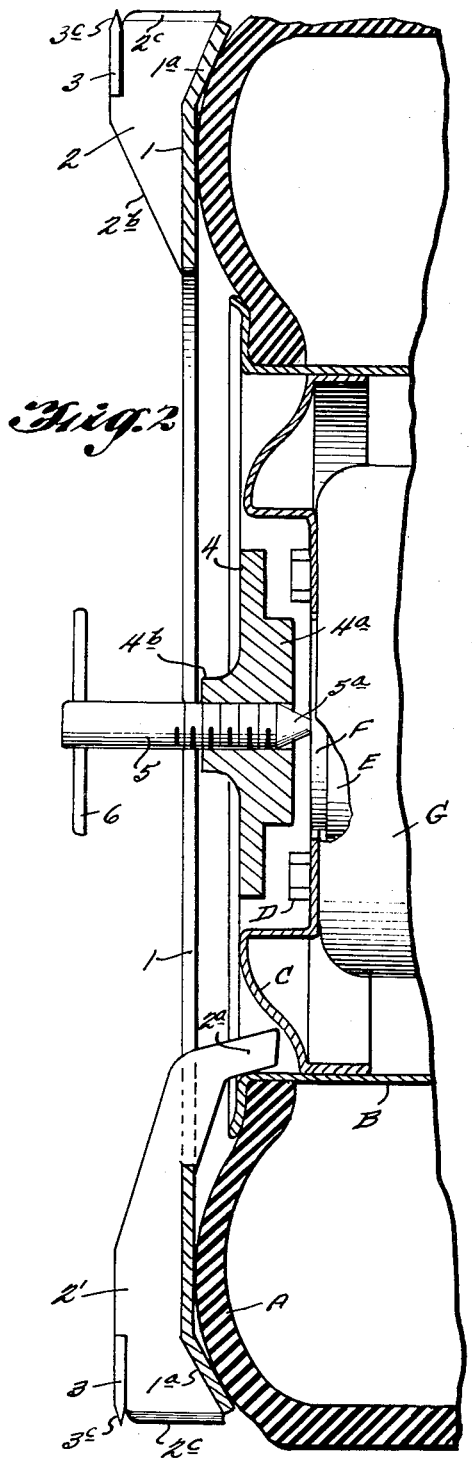
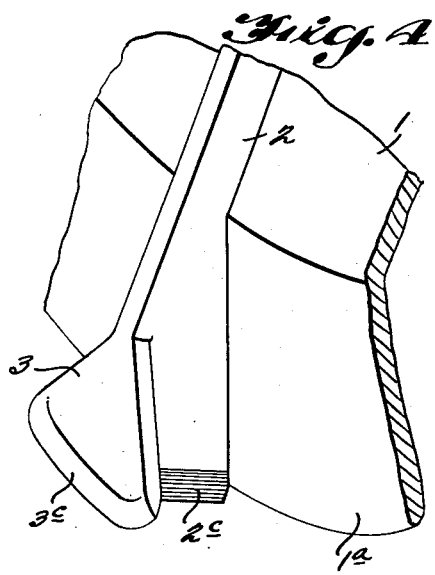
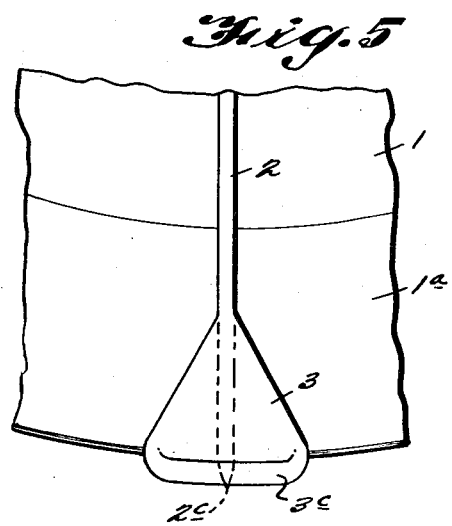
INVENTOR
WILBUR E. MURRAY
BY J. Hanson Boyden
ATTORNEY

2,930,656
TRACTION ATTACHMENTS FOR AUTOMOBILE WHEELS

Wilbur E. Murray, Baltimore, Md.

Application November 10, 1958, Serial No. 772,751

5 Claims. (Cl. 301—47)

This invention relates to a device for increasing the traction of automobile wheels in mud, sand or snow, and for preventing skidding of such wheels on hard ice.

An object of the invention is to provide a device of this character in the nature of an attachment which may be carried in the trunk of a car, like a spare wheel, and readily applied to the rear wheels when necessary.

Another object is to devise an attachment of this kind co-extensive with the periphery of the tire, but which may be quickly applied to the wheel by means of a single, central, fastening device.

A further object of the invention is to so construct an attachment of this nature that it may be applied to and removed from a wheel without the use of tools of any kind.

A still further object is to provide a traction attachment which, although of rigid construction throughout, and having no yielding, resilient, or relatively movable parts, may be used when travelling over bare, dry pavement without engaging or injuring the same.

With the above and other objects in view, and to simplify and improve generally on the details of such attachments, the invention consists in the construction, combination and arrangement of parts hereinafter described and claimed, and illustrated in the accompanying drawings, in which:

Fig. 3 is a fragmentary transverse section, also on an enlarged scale, substantially on the line 3—3 of Fig. 1, looking in the direction of the arrows;

Fig. 4 is a fragmentary perspective view showing a portion of my improved rim with one of the traction lugs carried thereby, and Fig. 5 is a fragmentary side elevation showing the same thing.

Figure 1:
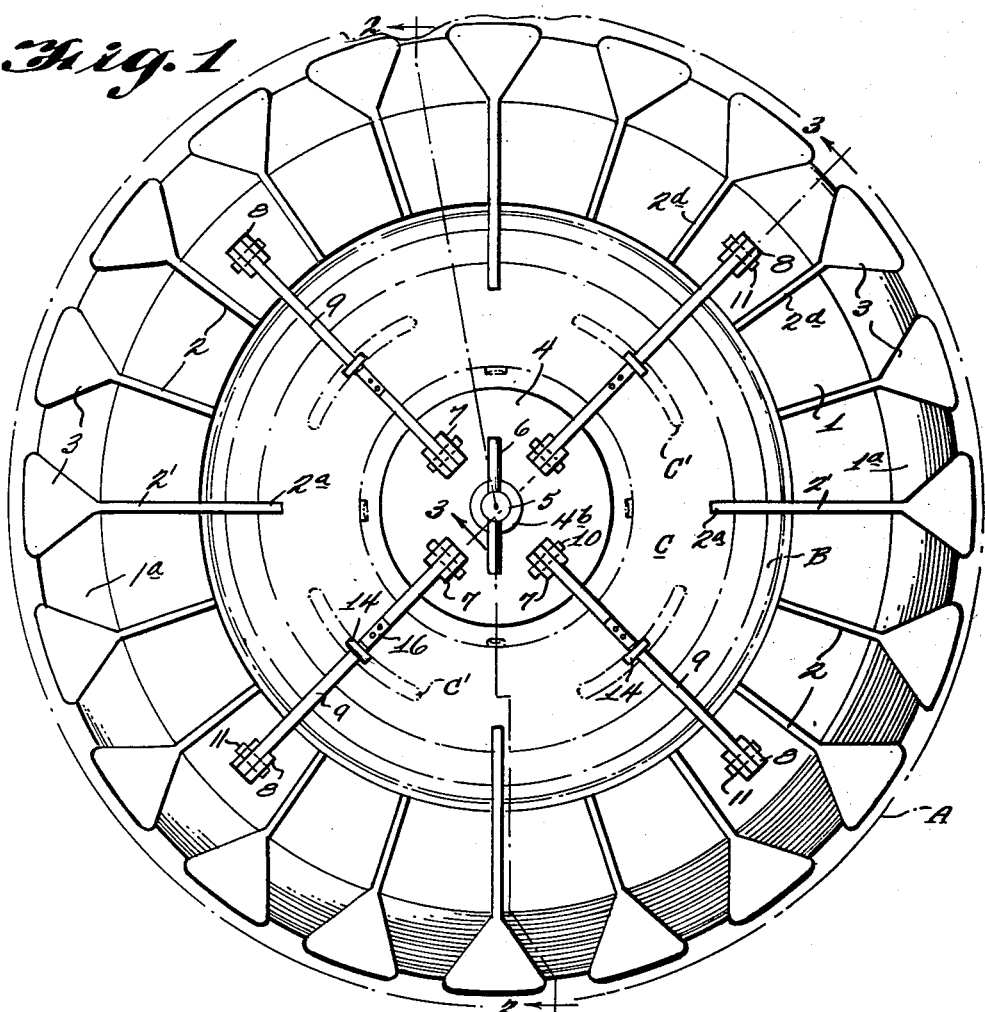
Fig. 1 is a side elevation of my improved traction increasing device as it appears when applied to an automobile wheel and tire, the wheel and tire being shown in broken lines.

Referring to the drawings in detail, the automobile wheel illustrated comprises a pneumatic tire A mounted on the usual rim B secured to a disc wheel C. This wheel is attached to the usual bolting flange E by means of bolts D, the brake drum G being also secured to this flange.

Although different models of cars differ slightly as to the details of the rear axle, the drawings illustrate a construction in which an enlarged disc or head F is secured to the extreme end of the live axle adjacent and outside of the bolting flange E. This disc or head usually has a central recess F', such recess being engaged by the center stock of the lathe on which the axle is turned when being manufactured.

Figure 2:
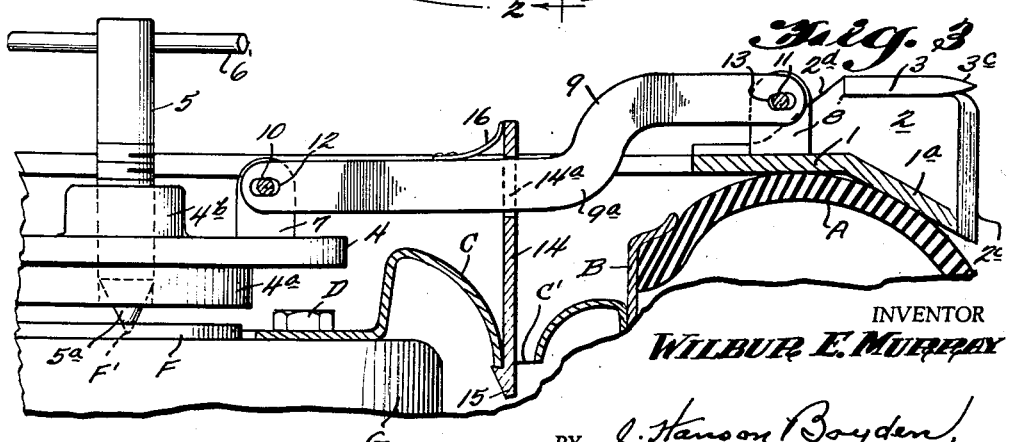
Fig. 2 is a transverse section on an enlarged scale substantially on the line 2—2 of Fig. 1, looking in the direction of the arrows.

My improved traction increasing attachment comprises a rim 1, 1ª of approximately the same diameter as that of the tire and, as shown in Figs. 2 and 3, being of relatively thin and wide design. The portion 1 lies parallel with the plane of the wheel while the outer portion 1ª is disposed at a slight angle to this plane, extending inwardly therefrom.

Rigidly secured to the outside of this rim, as by casting integral therewith, are a series of traction lugs 2 distributed uniformly around the circumference thereof. These lugs are of two different types. Several of them, four being shown by way of illustration, are formed with relatively long inwardly projecting radially disposed shanks or ribs 2', the inner end of these ribs extending inwardly toward the wheel and being positioned to engage the inside of the wheel rim B as shown at 2ª in Fig. 2. The shanks of the other lugs are relatively short and terminate at the inner edge of the rim, as shown. The radially inward portion of these lugs is preferably bevelled, as shown at 2ᵇ at the upper part of Fig. 2.

Each lug 2 extends at right angles to the plane of the rim 1 and has its outer end formed with a sharp or chisel edge 2ᶜ, as shown in Figs. 3, 4 and 5. Each lug 2 carries at its outer edge a triangular shaped portion 3, disposed at right angles to the lug or in a plane parallel with the rim 1. This portion 3 also has a sharpened outer end 3ᶜ. Disposed at the center of the rim 1 is a circular plate or disc 4, preferably having an inner thickened portion 4ª and an outer boss 4ᵇ, the plate being provided with a central threaded opening in which works a screw member 5 having at its outer end a cross bar 6 by which it may be manually turned.

Carried on the outer face of the plate 4 are a plurality of pairs of lugs 7, four such pairs being shown, and on the outer face of the rim 1 are formed a similar number of pairs of lugs 8. A plurality of radially extending bars or arms 9 are connected at their ends to the pairs of lugs 7 and the pairs of lugs 8 by pivots 10 and 11, respectively. The arms 9 are formed with slots 12 and 13 through which the pins 10 and 11 work, as clearly shown in Fig. 3. To permit ready insertion and removal of the pivot pins 11 the ribs of some of the lugs 2 are cut away on either side of each pair of lugs 8 as indicated at 2ᵈ in Fig. 3.

Most disc wheels are formed with a plurality of slots C', these slots being intended to receive straps for holding the so-called "bracelet" chains. I provide a plurality of wheel engaging members 14 having hooked ends 15 adapted to enter and engage the edge of the slots C', as shown in Fig. 3. Each of these wheel engaging members 14 is formed near its outer end with an opening 14ª through which one of the arms 9 loosely passes, and a leaf spring 16 is preferably provided to bear against the outer end of each of these wheel-engaging members to assist in holding it in position.

When it is desired to apply my improved traction attachment, the usual hub cap is removed and the rim 1 placed in engagement with the side of the tire while the pointed end 5ª of the screw member 5 is seated in the recess F' and the wheel engaging members 14 are hooked into the slots C', as shown in Fig. 3. Upon turning the screw member 5 by means of the handle or bar 6, the plate 4, and the inner ends of the arms 9 are forced away from the center of the wheel. These arms then pivot about their point of engagement with the wheel engaging members 14, and act as levers serving to press the rim 1 against the side of the tire. The further the member 5 is screwed in, the greater the pressure exerted by the rim on the tire, and I contemplate employing enough pressure to cause such close frictional engagement between the rim and tire as to constitute a driving connection. Thus the rim and lugs are frictionally driven from the tire as the wheel revolves, no other means for locking the rim to the wheel being required.

It will thus be seen that my improved traction attachment can be applied to the wheel by means of a single member only, namely, the screw member 5, and that this can be operated by hand, without the use of any tools whatever.

Fig. 2 shows the attachment as it appears when employed for use in mud, sand or deep snow. The rim and lugs are made of such size that when the tire is normally inflated, as shown in Fig. 2, the edges 2c and 3c of the lugs do not engage the pavement, and thus there is no danger of injuring the pavement. In fact, with the tire normally inflated, the vehicle can travel freely over bare dry streets without the lugs coming into contact therewith.

When, however, hard ice is encountered, the tire is slightly deflated and this results in the sharp edges of the lugs coming down far enough to engage and cut into the surface of the ice over which the wheel is travelling. It will, of course, be understood that the edge 2c of the lugs prevents spinning of the wheel and gives the necessary traction, while the edge 3c prevents side skidding.

While I have shown a disc wheel having slots which my improved wheel engaging members may enter, it will be understood that for use on other types of wheels, such, for example, as those having wire spokes, my improved wheel engaging members will be constructed to engage such spokes. In any event, the members such as 14 engage some part of the wheel so as to provide bearings about which the arms or levers 9 may pivot, so that the forcing outward of the inner ends of such arms will press the rim 1 against the outside of the tire and thus firmly hold the attachment in position.

What I claim is:

1. A traction attachment for application to the outer side of an automobile wheel having a resilient tire thereon comprising a rigid rim having traction lugs fixed thereto, and of substantially the same diameter as the tire with which the attachment is to be used, a single screw member operatively associated with said rim and disposed centrally thereof, and means operated by said single screw member alone for forcing said rim into close frictional driving contact with the side of the tire.

2. A traction attachment for application to the outer side of an automobile wheel mounted on an axle and having a resilient tire thereon, said attachment comprising a rigid rim, a plate disposed at the center thereof, a plurality of radially extending arms pivotally connected at their opposite ends respectively to said rim and plate, a plurality of wheel-engaging members each pivotally connected with a different one of said arms at a point intermediate the ends thereof, and means exerting thrust against the end of the axle on which such wheel is mounted, for forcing said plate axially outward, thus swinging said arms about their pivotal connection with said wheel-engaging members and pressing said rim into close frictional contact with the side of the tire on the wheel to which the attachment is applied.

3. A traction attachment for application to the outer side of an automobile wheel mounted on an axle and having a resilient tire thereon, said attachment comprising a rigid rim, a plate disposed at the center thereof, a plurality of radially extending arms pivotally connected at their opposite ends respectively to said rim and plate, a plurality of wheel-engaging members each pivotally connected with a different one of said arms at a point intermediate the ends thereof, and a screw member working through said plate and exerting thrust against the end of the axle on which such wheel is mounted, for forcing said plate axially outward, thus swinging said arms about their pivotal connection with said wheel-engaging members and pressing said rim into close frictional contact with the side of the tire on the wheel to which the attachment is applied.

4. A traction attachment for application to the outer side of an automobile disc wheel mounted on an axle and having openings therethrough and having a resilient tire thereon, said attachment comprising a rigid rim, a plate disposed at the center thereof, a plurality of radially extending arms pivotally connected at their opposite ends respectively to said rim and plate, a plurality of members each constructed to engage in a different one of the openings in the wheel to which the attachment is to be applied and pivotally connected with a different one of said arms at a point intermediate its ends, and means exerting thrust against the end of the axle on which such wheel is mounted, for forcing said plate axially outward, thus swinging said arms about their pivotal connection with said opening-engaging members and pressing said rim into close frictional contact with the side of the tire.

5. A traction attachment for application to the outer side of an automobile wheel having a pneumatic tire thereon comprising a rigid rim of approximately the same diameter as the tire with which the attachment is to be used, traction lugs immovably fixed to and projecting axially from the outer side face of said rim, said lugs extending slightly radially beyond the peripheral edge thereof, means for clamping said rim to a wheel with its inner face in contact with the side of the tire, and with the tread of the tire extending somewhat beyond the ends of said lugs when the tire is normally inflated, whereby said lugs do not normally engage the roadway, and whereby, by partially deflating the tire, the said lugs may be brought into contact with the surface over which the tire is traveling.

References Cited in the file of this patent

UNITED STATES PATENTS

| | | |
|---|---|---|
| 1,376,792 | Ballard | May 3, 1921 |
| 2,677,578 | Trifiletti | May 4, 1954 |
| 2,805,101 | Bruce | Sept. 3, 1957 |

FOREIGN PATENTS

| | | |
|---|---|---|
| 163,329 | Sweden | May 20, 1958 |